US012562165B2

(12) United States Patent
Zhang et al.

(10) Patent No.: US 12,562,165 B2
(45) Date of Patent: Feb. 24, 2026

(54) AUDIO-VISUAL QUESTION ANSWERING

(71) Applicant: Lemon Inc., Grand Cayman (KY)

(72) Inventors: Peng Zhang, Los Angeles, CA (US);
Xiulong Liu, Culver City, CA (US);
Zhikang Dong, Culver City, CA (US)

(73) Assignee: Lemon Inc., Grand Cayman (KY)

( * ) Notice: Subject to any disclaimer, the term of this
patent is extended or adjusted under 35
U.S.C. 154(b) by 207 days.

(21) Appl. No.: 18/472,528

(22) Filed: Sep. 22, 2023

(65) Prior Publication Data

US 2025/0104701 A1     Mar. 27, 2025

(51) Int. Cl.
| | |
|---|---|
| *G10L 15/22* | (2006.01) |
| *G06V 10/77* | (2022.01) |
| *G06V 10/774* | (2022.01) |
| *G10L 15/06* | (2013.01) |

(52) U.S. Cl.
CPC .......... *G10L 15/22* (2013.01); *G06V 10/7715*
(2022.01); *G06V 10/774* (2022.01); *G10L
15/063* (2013.01)

(58) Field of Classification Search
CPC ....... G10L 15/22; G10L 15/063; G10L 25/57;
G06V 10/7715; G06V 10/774; G06V
10/806
See application file for complete search history.

(56) References Cited

U.S. PATENT DOCUMENTS

| | | | | |
|---|---|---|---|---|
| 2017/0124432 | A1* | 5/2017 | Chen | G06N 5/04 |
| 2021/0082398 | A1* | 3/2021 | Hori | G06N 3/044 |
| 2022/0230628 | A1* | 7/2022 | Zhu | G10L 15/063 |
| 2022/0383037 | A1* | 12/2022 | Pham | G06F 18/25 |
| 2023/0136861 | A1* | 5/2023 | Tunstall-Pedoe | G10L 15/16 |
| | | | | 704/9 |

(Continued)

OTHER PUBLICATIONS

Abu-El-Hajia et al.; "YouTube-8M: A Large-Scale Video Classification Benchmark"; Computer Vision and Pattern Recognition; arXiv:1609.08675; 2016; 10 pages.

(Continued)

*Primary Examiner* — Michael Colucci
(74) *Attorney, Agent, or Firm* — BakerHostetler

(57) ABSTRACT

The present disclosure describes techniques for improving audio-visual question answering. A machine learning model is configured for audio-visual question answering (AVQA). The machine learning model comprises a first sub-model configured to capture semantic audio information and output an audio spatial feature map $x_{as}^{(1)}$. The machine learning model comprises a second sub-model configured to extract visual features $x_{vs}$ and audio features $x_{as}$ and further configured to obtain a question vector $x_q$. The machine learning model comprises a third sub-model configured to capture audio-visual correspondence at a granular level. A balanced AVQA dataset is created. The balanced AVQA dataset comprises balanced answer distribution in each question category. The machine learning model is trained to answer questions about visual objects, sounds, and their associations in videos using at least a subset of the balanced AVAQ dataset.

20 Claims, 16 Drawing Sheets

100

(56)      References Cited

U.S. PATENT DOCUMENTS

| 2023/0162481 | A1* | 5/2023 | Yuan | G06T 9/00 |
| | | | | 382/159 |
| 2023/0169362 | A1* | 6/2023 | Beucher | G06N 3/096 |
| | | | | 706/12 |
| 2023/0229960 | A1* | 7/2023 | Zhu | G10L 15/063 |
| | | | | 706/12 |
| 2023/0267726 | A1* | 8/2023 | Yoon | G06N 3/044 |
| | | | | 382/190 |
| 2023/0368268 | A1* | 11/2023 | Wang | G06Q 30/0631 |
| 2023/0419652 | A1* | 12/2023 | Tiong | G06V 10/82 |
| 2024/0046628 | A1* | 2/2024 | Zhu | G06V 10/82 |
| 2024/0242705 | A1* | 7/2024 | Wang | G10L 13/047 |

OTHER PUBLICATIONS

Agrawal et al.; "Don't Just Assume; Look and Answer: Overcoming Priors for Visual Question Answering"; IEEE Int'l Conf. on Computer Vision and Pattern Recognition; 2018; p. 4971-4980.

Antol et al. "VQA: Visual Question Answering"; IEEE Int'l Conf. on Computer Vision; 2015; p. 2425-2433.

Cadene et al.; "RUBi: Reducing Unimodal Biases for Visual Question Answering"; 33rd Conf. on Neural Information Processing Systems; 2019; 12 pages.

Chatterjee et al.; "Visual Scene Graphs for Audio Source Separation"; IEEE/CVF Int'l Conf. on Computer Vision; 2021; p. 1204-1213.

Chen et al.; "A Simple Framework for Contrastive Learning of Visual Representations"; 37th Int'l Conf. on Machine Learning; vol. 119; 2020; p. 1597-1607.

Chen et al.; "Improved Baselines with Momentum Contrastive Learning"; Computer Vision and Pattern Recognition; arXiv:2003. 04297; 2020; 3 pages.

Di et al.; "Video Background Music Generation with Controllable Music Transformer"; 29th ACM Int'l Conf. on Multimedia; 2021; p. 2037-2045.

Duan et al.; "Audio-Visual Event Localization via Recursive Fusion by Joint Co-Attention"; IEEE/CVF Winter Conf. on Applications on Computer Vision; 2021; p. 4013-4022.

Gan et al.; "Foley Music: Learning to Generate Music from Videos"; European Conf. on Computer Vision; 2020; p. 758-775.

Gan et al.; "Music Gesture for Visual Sound Separation"; IEEE/CVF Conf. on Computer Vision and Pattern Recognition; 2020; p. 10478-10487.

Gao et al.; "Learning to Separate Object Sounds by Watching Unlabeled Video"; European Conf. on Computer Vision; 2018; p. 35-53.

Gao et al.; "Co-Separating Sounds of Visual Objects"; IEEE/CVF Int'l Conf. on Computer Vision; 2019; p. 3879-3888.

Ginosar et al.; "Learning Individual Styles of Conversational Gesture"; IEEE/CVF; IEEE/CVF Conf. on Computer Vision and Pattern Recognition; 2019; p. 3497-3506.

Gong et al.; "Contrastive Audio-Visual Masked Autoencoder"; Computer Vision and Pattern Recognition; 2023; arXiv:2210. 07839; 29 pages.

Grill et al.; "Bootstrap Your Own Latent a New Approach to Self-Supervised Learning"; 34th Conf. on Neural Information Processing Systems; 2020; 14 pages.

He et al.; "Masked Autoencoders Are Scalable Vision Learners"; IEEE/CVF Conf. on Computer Vision and Pattern Recognition; 2022; p. 16000-16009.

Kv et al.; "Reducing Language Biases in Visual Question Answering with Visually-Grounded Question Encoder"; European Conf. on Computer Vision; 2020; p. 18-34.

Lee et al.; "Dancing to Music"; 33rd Conf. on Neural Processing Systems; 2019; 11 pages.

Li et al.; "Learning to Answer Questions in Dynamic Audio-Visual Scenarios"; IEEE/CVF Conf. on Computer Vision and Pattern Recognition; 2022; p. 19108-19118.

Lin et al.; "Vision Transformers Are Parameter-Efficient Audio-Visual Learners"; IEEE/CVF Conf. on Computer Vision and Pattern Recognition; 2023; p. 2299-2309.

Liu et al.; "Swin Transformer V2: Scaling up Capacity and Resolution"; IEEE/CVF Conf. on Computer Vision and Pattern Recognition; 2022; p. 12009-12019.

Morgado et al.; "Learning Representations from Audio-Visual Spatial Alignment"; 34th Conf. on Neural Information Processing Systems; 2020; 12 pages.

Morgado et al.; "Robust Audio-Visual Instance Discrimination"; IEEE/CVF Conf. on Computer Vision and Pattern Recognition; 2021; p. 12934-12945.

Shlizerman et al.; "Audio to Body Dynamics"; IEEE Conf. on Computer Vision and Pattern Recognition; 2018; p. 7574-7583.

Su et al.; "Audeo: Audio Generation for a Silent Performance Video"; 34th Conf. on Neural Information Processing Systems; 2020; 13 pages.

Su et al.; "Multi-Instrumentalist Net: Unsupervised Generation of Music from Body Movements"; Computer Vision and Pattern Recognition; arXiv:2012.03478; 2020; 10 pages.

Su et al.; "How Does it Sound? Generation of Rhythmic Soundtracks for Human Movement Videos"; 35th Conf. on Neural Information Processing Systems; 2021; 16 pages.

Tian et al.; "Cyclic Co-Learning of Sounding Object Visual Grounding and Sound Separation"; IEEE/CVF; 2021; p. 2745-2754.

Tian et al.; "Audio-Visual Event Localization in Unconstrained Videos"; European Conf. on Computer Vision; 2018; p. 247-263.

Wu et al.; "Dual Attention Matching for Audio-Visual Event Localization"; IEEE/CVF Int'l Conf. on Computer Vision; 2019; p. 6292-6300.

Xia et al.; "Cross-Modal Background Suppression for Audio-Visual Event Localization"; IEEE/CVF Conf. on Computer Vision and Pattern Recognition; 2022; p. 19989-19998.

Xuan et al.; "Cross-Modal Attention Network for Temporal Inconsistent Audio-Visual Event Localization"; 34th AAAI Conf. on Artificial Intelligence; 2020; p. 279-286.

Yang et al.; "Avqa: A Dataset for Audio-Visual Question Answering on Videos"; 30th ACM Int'l Conf. on Multimedia; 2022; p. 3480-3491.

Yun et al.; "Pano-AVQA: Grounded Audio-Visual Question Answering on 360deg Videos"; IEEE/CVF Int'l Conf. on Computer Vision; 2021; p. 2031-2041.

Zhang et al.; "Yin and Yang: Balancing and Answering Binary Visual Questions"; IEEE Conf. on Computer Vision and Pattern Recognition; 2016; p. 5014-5022.

Zhao et al.; "The Sound of Motions"; IEEE/CVF Int'l Conf. on Computer Vision; 2019; p. 1735-1744.

Zhao et al.; "The Sound of Pixels"; European Conf. on Computer Vision; 2018; p. 570-586.

Zhou et al.; "Audio-Visual Segmentation"; European Conf. on Computer Vision; arXiv:2207.05042; 2023; 12 pages.

* cited by examiner

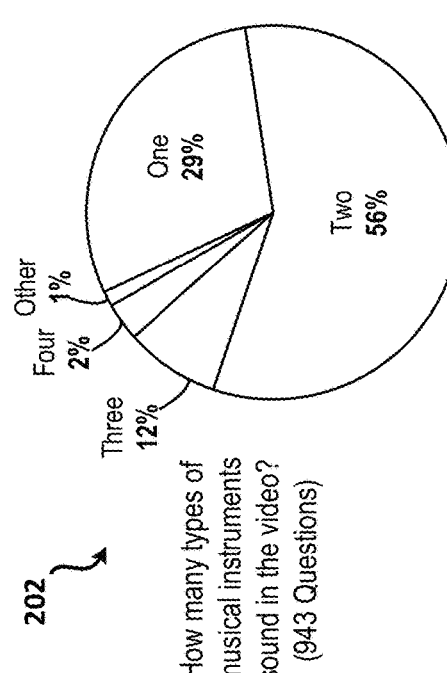
202
How many types of musical instruments sound in the video? (943 Questions)
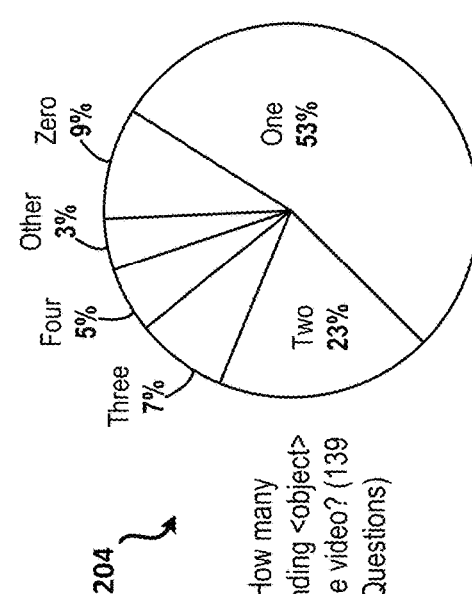
204
How many sounding <object> in the video? (139 Questions)
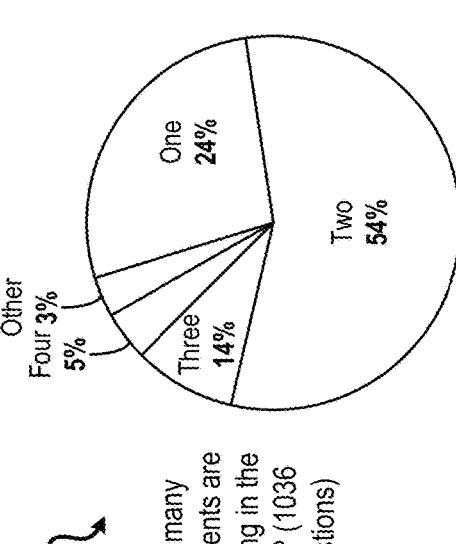
201
How many instruments are sounding in the video? (1036 Questions)
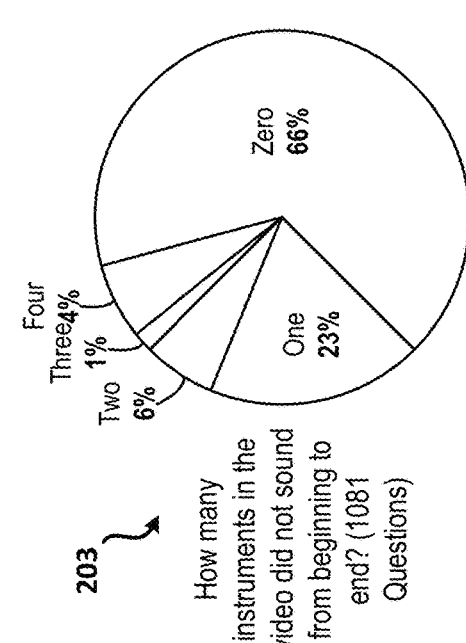
203
How many instruments in the video did not sound from beginning to end? (1081 Questions)
FIG. 2

600

Configure a machine learning model for audio-visual question answering (AVQA), wherein the machine learning model comprises a first sub-model configured to capture semantic audio information and output an audio spatial feature map, wherein the machine learning model comprises a second sub-model configured to extract visual features and audio features and further configured to obtain a question vector, and wherein the machine learning model comprises a third sub-model configured to capture audio-visual correspondence at a granular level 602

Create a balanced AVQA dataset, wherein the balanced AVQA dataset comprises balanced answer distribution in each question category 604

Train the machine learning model using at least a subset of the balanced AVAQ dataset, wherein the machine learning model is trained to answer questions about visual objects, sounds, and their associations in videos 606

FIG. 6

700

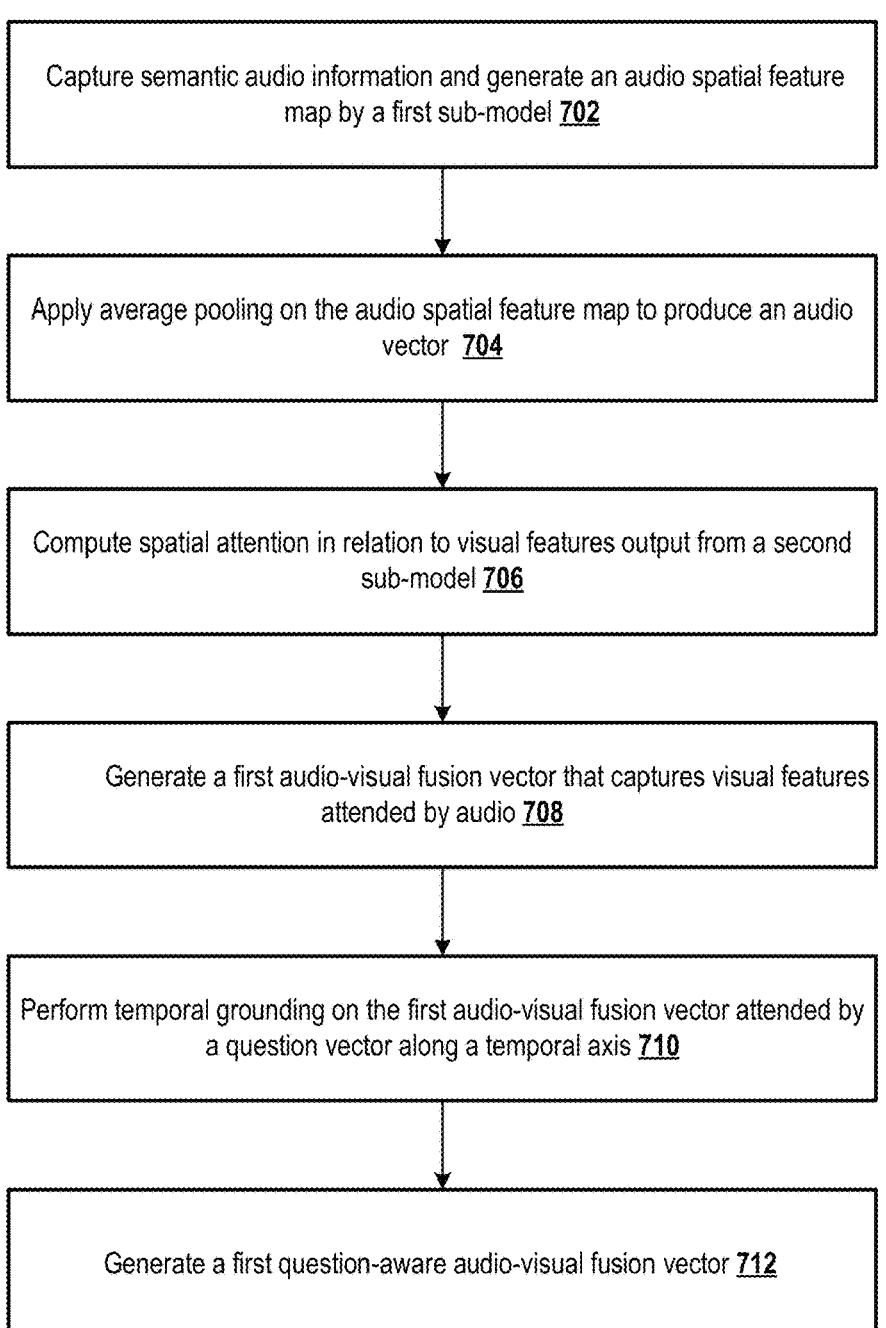

Capture semantic audio information and generate an audio spatial feature map by a first sub-model 702

Apply average pooling on the audio spatial feature map to produce an audio vector 704

Compute spatial attention in relation to visual features output from a second sub-model 706

Generate a first audio-visual fusion vector that captures visual features attended by audio 708

Perform temporal grounding on the first audio-visual fusion vector attended by a question vector along a temporal axis 710

Generate a first question-aware audio-visual fusion vector 712

FIG. 7

800

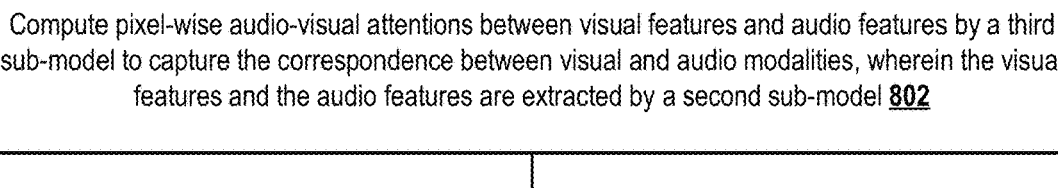

Compute pixel-wise audio-visual attentions between visual features and audio features by a third sub-model to capture the correspondence between visual and audio modalities, wherein the visual features and the audio features are extracted by a second sub-model 802

Generate a second audio-visual fusion vector by the third sub-model 804

Perform temporal grounding on the second audio-visual fusion vector attended by a question vector along a temporal axis 806

Generate a second question-aware audio-visual fusion vector 808

Configure a machine learning model for audio-visual question answering (AVQA), wherein the machine learning model comprises a first sub-model configured to capture semantic audio information and output an audio spatial feature map, wherein the machine learning model comprises a second sub-model configured to extract visual features and audio features and further configured to obtain a question vector, and wherein the machine learning model comprises a third sub-model configured to capture audio-visual correspondence at a granular level 902

Create a balanced AVQA dataset, wherein the balanced AVQA dataset comprises balanced answer distribution in each question category 904

Train the machine learning model using at least a subset of the balanced AVAQ dataset, wherein the machine learning model is trained to answer questions about visual objects, sounds, and their associations in videos 906

Concatenate a question-aware audio-visual fusion vector generated based on outputs from the second sub-model, a first question-aware audio-visual fusion vector generated based on output of the first sub-model, and a second question-aware audio-visual fusion vector generated based on output of the third sub-model to generate a final question-aware audio-visual fusion vector 908

| Model | Train set | Total | Audio-Visual | | | | | Visual | | Audio | |
|---|---|---|---|---|---|---|---|---|---|---|---|
| | | | Ext | Temp | Cnt | Loc | Comp | Cnt | Loc | Cnt | Comp |
| AVST [20] | bias | 69.40 | 70.16 | 61.94 | 62.99 | 63.26 | 63.94 | 75.02 | 78.85 | 77.86 | 63.61 |
| | balanced | 71.15 | 71.38 | 59.98 | 68.85 | 63.48 | 65.40 | 77.61 | 77.80 | 82.13 | 62.05 |
| LAVISH [21] | bias | 70.39 | 68.11 | 60.08 | 66.72 | 65.11 | 63.12 | 78.14 | 81.46 | 78.80 | 60.96 |
| | balanced | 73.35 | 72.04 | 63.19 | 71.95 | 67.07 | 63.40 | 80.40 | 82.66 | 83.57 | 63.14 |

FIG. 11

Figure 12:
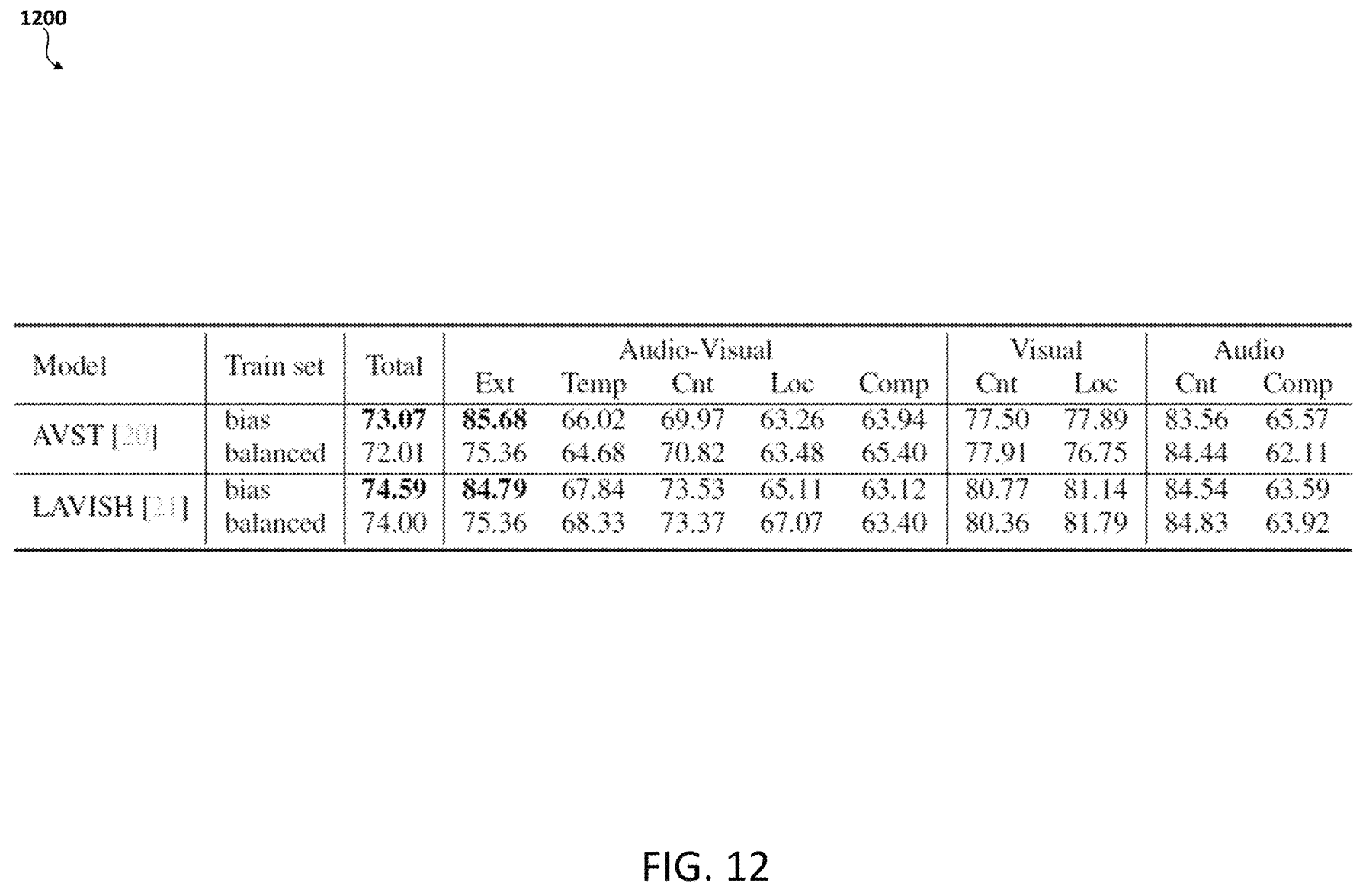

| Model | Train set | Total | Audio-Visual | | | | | Visual | | Audio | |
|---|---|---|---|---|---|---|---|---|---|---|---|
| | | | Ext | Temp | Cnt | Loc | Comp | Cnt | Loc | Cnt | Comp |
| AVST [20] | bias | 73.07 | 85.68 | 66.02 | 69.97 | 63.26 | 63.94 | 77.50 | 77.89 | 83.56 | 65.57 |
| | balanced | 72.01 | 75.36 | 64.68 | 70.82 | 63.48 | 65.40 | 77.91 | 76.75 | 84.44 | 62.11 |
| LAVISH [21] | bias | 74.59 | 84.79 | 67.84 | 73.53 | 65.11 | 63.12 | 80.77 | 81.14 | 84.54 | 63.59 |
| | balanced | 74.00 | 75.36 | 68.33 | 73.37 | 67.07 | 63.40 | 80.36 | 81.79 | 84.83 | 63.92 |

| Model | Total | Audio-Visual | | | | | Visual | | Audio | |
|---|---|---|---|---|---|---|---|---|---|---|
| | | Ext | Temp | Cnt | Loc | Comp | Cnt | Loc | Cnt | Comp |
| AVST [20] | 71.02 | 72.44 | 59.36 | 68.22 | 65.54 | 63.31 | 77.48 | 77.88 | 82.34 | 60.81 |
| LAVISH [21] | 73.18 | 73.83 | 60.81 | 73.28 | 65.00 | 63.49 | 81.99 | 80.57 | 84.37 | 58.48 |
| LAST | 74.85 | 74.08 | 59.15 | 75.17 | 69.02 | 66.12 | 83.19 | 83.41 | 85.75 | 61.59 |
| LAST-Att | 75.44 | 76.21 | 60.60 | 75.23 | 68.91 | 65.60 | 84.12 | 84.01 | 86.03 | 62.52 |

| Model | Total | Audio-Visual | | | | | | Visual | | Audio | |
| | | Ext | Temp | Cnt | Loc | Comp | | Cnt | Loc | Cnt | Comp |
|---|---|---|---|---|---|---|---|---|---|---|---|
| AVST | 71.92 | 75.36 | 64.81 | 70.51 | 65.54 | 63.31 | | 77.74 | 76.67 | 84.74 | 61.78 |
| LAVISH [21] | 73.51 | 74.92 | 66.5 | 75.08 | 65 | 63.49 | | 82.08 | 79.59 | 85.32 | 59.14 |
| LAST | 75.24 | 75.58 | 65.78 | 76.16 | 69.02 | 66.12 | | 83.63 | 82.36 | 86.20 | 61.78 |
| LAST-Att | 75.45 | 76.47 | 66.75 | 76.20 | 68.91 | 65.60 | | 83.86 | 83.09 | 85.71 | 63.10 |

FIG. 14

| Model | Total Accuracy |
|---|---|
| AVST [20] | 52.4 |
| LAVISH [21] | 54.47 |
| LAST | 58.00 |
| LAST-Att | 58.86 |

AUDIO-VISUAL QUESTION ANSWERING

BACKGROUND

Machine learning models are increasingly being used across a variety of industries to perform a variety of different tasks. Such tasks may include audio-visual tasks. Improved techniques for utilizing and training machine learning models are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 2 shows an example training data imbalance in accordance with the present disclosure.

FIG. 6 shows an example process for improving audio-visual answering which may be performed in accordance with the present disclosure.

FIG. 7 shows another example process for improving audio-visual answering which may be performed in accordance with the present disclosure.

FIG. 8 shows another example process for improving audio-visual answering which may be performed in accordance with the present disclosure.

FIG. 9 shows another example process for improving audio-visual answering which may be performed in accordance with the present disclosure.

FIG. 11 shows example quantitative results in accordance with the present disclosure.

FIG. 12 shows example quantitative results in accordance with the present disclosure.

FIG. 13 shows example quantitative results in accordance with the present disclosure.

FIG. 14 shows example quantitative results in accordance with the present disclosure.

FIG. 15 shows example quantitative results in accordance with the present disclosure.

DETAILED DESCRIPTION OF ILLUSTRATIVE EMBODIMENTS

Figure 1:
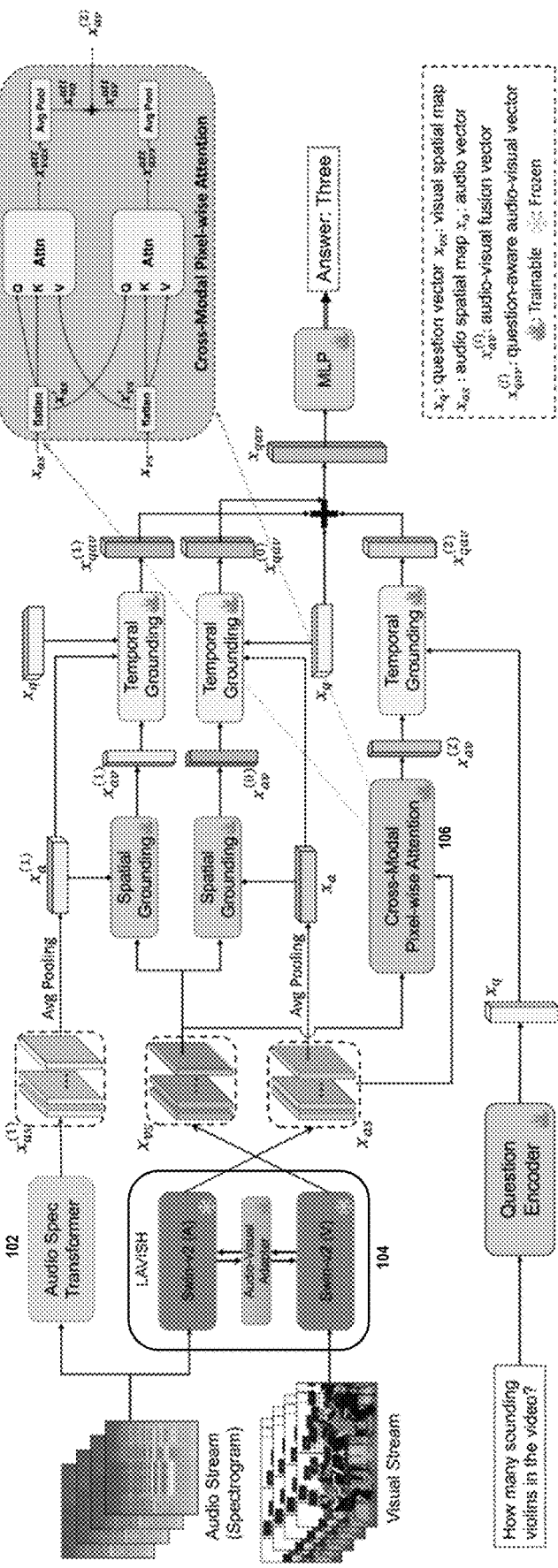
FIG. 1 shows an example system for improving audio-visual answering in accordance with the present disclosure.

In audio-visual learning, the interplay between audio and visual information provides a rich avenue for understanding dynamic scenarios. One particular task that embodies this synergy is Audio-Visual Question Answering (AVQA). Given a musical instrument performance video and associated music audio, AVQA machine learning models may be used to answer questions that are related to the video, audio, and/or the relationship between the video and audio. Unlike Visual Question Answering (VQA) tasks, which only tackle two modalities (e.g., vision and language), AVQA is designed to bridge and reason through three modalities (e.g., vision, language, and audio).

To train AVQA machine learning models, a training dataset (hereinafter referred to as the "MUSICAVQA dataset") may be used. The MUSICAVQA dataset comprises three major question categories by modality: audio-visual questions, visual questions, and audio questions. Across all three of these question categories, five question aspects are considered, including existential question aspects (e.g., "yes/no" questions that ask whether something exists), temporal question aspects (e.g., questions that ask about the order of instrument performance), counting question aspects (e.g., questions that ask about the quantity of an object or sound in the video), location question aspects (e.g., questions that ask where the location of the performance is, and/or where a specific performer is located), and comparative question aspects (e.g., questions that compare different instruments in the video). By joining the modality types with the various question aspects, the MUSICAVQA dataset ends up with 33 question templates, in which one can change the instrument name from one to another based on the video. Each question template contains a fixed set of answers, ranging from binary answers (e.g., "yes" and "no") to counting answers (e.g., "1", "2", "3" etc.) and so on.

However, the MUSICAVQA dataset has a strong bias that undermines the reliability of the MUSICAVQA dataset as a credible benchmark. For example, in a particular question category asking about whether or not the audio track of the video comes from the instrument being played in the video, over 90% of the answers in the dataset are "yes." For audio-visual temporal questions, when asking which instrument in the video sounds first, nearly 80% of the answers in the dataset are "Simultaneously." For counting questions, more than half of the answers in the dataset are small numbers (e.g., 1 and 2). These imbalances exist across all five of the question aspects. Such bias may negatively impact the training of AVQA models, as the models will be trained to favor the most common answers in the training set and to ignore the importance of video and audio, as well as the reasoning between three of them. Thus, improved techniques for audio-visual answering are desirable.

Described here are improved techniques for audio-visual answering. The system described herein includes a machine learning model that is able to learn the connections across all the three different modalities. The machine learning model described herein extends existing methods by adding an additional audio-spectrogram-transformer (AST) branch for audio-visual grounding and designing a cross-modal pixel-wise attention between audio and visual spatial maps. The machine learning model described herein is trained on an improved, balanced dataset (hereinafter referred to as MUSIC-AVQA v2.0). Because the dataset is more balanced than the MUSICAVQA dataset, the machine learning model described herein performs better than existing AVQA machine learning models.

FIG. 1 illustrates an example system 100 for improving audio-visual answering. The system 100 may comprise a machine learning model configured for audio-visual question answering (AVQA). The machine learning model may comprise a first sub-model 102, a second sub-model 104, and a third sub-model 106. The machine learning model may be configured to answer an audio-visual question (e.g., "How many sounding violins are in the video?") associated with a musical performance video. The audio-visual question may be received by the machine learning model. For example, the audio-visual question may be received by a question encoder of the second sub-model 104. The question encoder may generate a question vector $x_q$ representative of the audio-visual question.

The first sub-model 102 may comprise an audio-visual fusion branch. The first sub-model 102 may comprise an audio spectrogram transformer (AST). The first sub-model 102 may receive, as input, an audio stream (e.g., spectrogram) associated with the musical performance video. The first sub-model 102 may be configured to extract audio features from the audio stream using a pretrained AST. The first sub-model 102 may merge the extracted features with a visual feature branch of the second sub-model 104, leveraging audio-visual spatial and temporal grounding. The first sub-model 102 may enable the system 100 to capture richer semantic audio information compared to existing systems. Specifically, the hidden output of the first sub-model 102 may be extracted. The hidden output of the first sub-model 102 may comprise a spatial feature map $x_{as}^{(1)}$. The first sub-model 102 may apply average pooling on the spatial feature map $x_{as}^{(1)}$ to produce an audio vector $x_a^{(1)}$.

The second sub-model 104 may receive, as input, the audio stream (e.g., spectrogram) and a visual stream associated with the musical performance video. The second sub-model 104 may be configured to extract visual features (e.g., visual map) $x_{vs}$ and audio features $x_{as}$ from the audio stream and the visual stream. For example, the second sub-model 104 may comprise a 2-tower pretrained Swin-Transformer V2 with an audio-visual adapter" (e.g., "LAVISH") for audio-visual fusion. The LAVISH component may extract the visual features (e.g., visual map) $x_{vs}$ and the audio features $x_{as}$ from the audio stream and the video. The second sub-model 104 may apply average pooling on the audio features $x_{as}$ to produce an audio vector $x_a$. The second sub-model 102 may compute spatial attention on the audio vector $x_a$ in relation to the visual features (e.g., visual map) $x_{vs}$. The resulting spatial grounding module output is a vector in each frame, $x_{av}^{(0)}$, capturing visual features attended by audio. Temporal grounding may be applied on $x_{av}^{(0)}$ by concatenating $x_{av}^{(0)}$ with audio features, which are then attended by the question vector $x_q$ produced by a Long Short-Term Memory (LSTM) encoder along the temporal axis.

The first sub-model 102 may compute spatial attention on the audio vector $x_a^{(1)}$ in relation to visual features (e.g., visual map) $x_{vs}$ output from the vision branch of the second sub-model 104. The resulting spatial grounding module output is a vector in each frame, $x_{av}^{(1)}$, capturing visual features attended by audio. Following this, the first sub-model 102 may perform temporal grounding on the first audio-visual fusion vector $x_{av}^{(1)}$ attended by the question vector $x_q$ along a temporal axis. $x_{av}^{(1)}$ may be concatenated with audio features, which are then attended by the question vector $x_q$ produced by a Long Short-Term Memory (LSTM) encoder along the temporal axis. The output of temporal grounding module may be a first question-aware audio-visual fusion vector $x_{qav}^{(1)}$.

The third sub-model 106 may comprise a cross-modal pixel-wise attention sub-model. The third sub-model 106 may be configured to capture and refine audio-visual correspondence at a granular level. Existing spatial grounding approaches use a mean-pooled audio vector to compute attention with visual spatial maps. But using a mean-pooled audio vector to compute attention with visual spatial maps causes the spatial details of spectrogram features to be lost, and is unidirectional (e.g., only the audio vector serves as a query to the visual maps without any reciprocal interaction).

To address these limitations, the third sub-model 106 performs a refined pixel-wise cross attention between the visual features $x_{vs}$ and the audio features $x_{as}$, aiming to capture the correspondence between the visual and audio modalities more effectively. Specifically, given $x_{vs} \in R^{H \times W \times C}$ representing a frame-level visual map output from the second sub-model 104, and $x_{as} \in R^{H \times W \times C}$ representing a spectrogram frame-level feature output from the second sub-model 104, the third sub-model 106 may compute two pixel-wise audio-visual attentions between two maps. The spatial dimension of both feature maps may first be flattened to be $(HW) \times C$, resulting in $x'_{vs}$ and $x'_{as}$. Then a mutual cross-attention between these two flattened maps may be computed, where each map attends to the other. The mutual cross attention between these two flattened maps may be represented as follows:

$$x_{vas}^{att} = x'_{as} + \text{Softmax}\left(\frac{x'_{vs}x'^{T}_{as}}{HW}\right)x'_{as},$$

$$x_{avs}^{att} = x'_{vs} + \text{Softmax}\left(\frac{x'_{as}x'^{T}_{vs}}{HW}\right)x'_{vs}.$$

The obtained $x_{vas}$ and $x_{avs}$ represent the pixel-wise fusion maps for the audio and vision branch, respectively. The third sub-model 106 may normalize both maps. The third sub-model 106 may average pool the spatial dimensions of the normalized maps to produce two vectors, $x_{av}$ and $x_{va}$. The third sub-model 106 may concatenate the two vectors, $x_{av}$ and $x_{va}$ to generate a second audio-visual fusion vector $x_{av}^{(2)}$. The second audio-visual fusion vector $x_{av}^{(2)}$ may have the same dimensions as $x_{av}^{(0)}$, $x_{av}^{(1)}$ (i.e., the outputs of the spatial grounding modules from the first sub-model 102 and the second sub-model 104). As a result, subsequent operations, such as temporal grounding, remain consistent with the other two branches. The third sub-model 106 may perform temporal grounding on the second audio-visual fusion vector $x_{av}^{(2)}$ attended by the question vector $x_q$ along a temporal axis. The third sub-model 106 may generate a second question-aware audio-visual fusion vector $x_{qav}^{(2)}$.

The system 100 may concatenate the output from the various branches of the machine learning model to generate a final question-aware audio-visual fusion vector $x_{qav}$. The system 100 may concatenate the question-aware audio-visual fusion vector $x_{qav}^{(0)}$ (e.g., the output of the temporal grounding module of the second sub-model 104), the first question-aware audio-visual fusion vector $x_{qav}^{(1)}$ (e.g., the output of the temporal grounding module of the first sub-model 102), and the second question-aware audio-visual fusion vector $x_{qav}^{(2)}$ (e.g., the output of the third sub-model 106) to generate the final question-aware audio-visual fusion vector $x_{qav}$. The concatenation of the question-aware audio-visual fusion vector $x_{qav}^{(0)}$, the first question-aware audio-visual fusion vector $x_{qav}^{(1)}$, and the second question-aware audio-visual fusion vector $x_{qav}^{(2)}$ may be passed to a multilayer perceptron (MLP) for classification. The classification may indicate an answer to the audio-visual question (e.g., "How many sounding violins are in the video?"). For example, the answer may be "three" or any other suitable answer to the audio-visual question.

Figure 3:
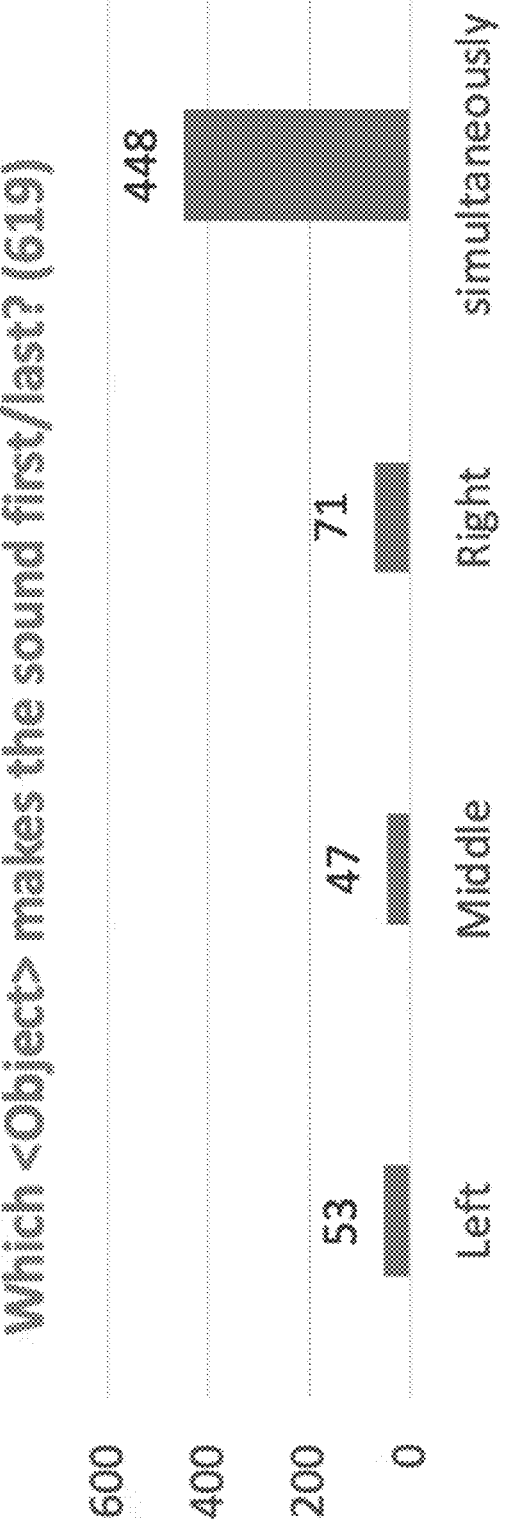
FIG. 3 shows another example training data imbalance in accordance with the present disclosure.

The machine learning model may be trained on a balanced dataset. Existing AVQA machine learning models may be trained on imbalanced datasets. FIGS. 2-3 show example imbalances in existing AVQA training datasets. FIG. 2 shows example training data imbalances for audio-visual counting questions. For the counting question 201 "How many instruments are sounding in the video?" 1036 training data samples may exist. Of these 1036 training data samples, 24% are associated with the answer "1," 54% are associated with the answer "2," 14% are associated with the answer "3," and only 8% are associated with an answer greater than "3." A similar imbalance is seen with other audio-visual counting questions. For the counting question 202 "How many types of musical instruments sound in the video?" 943 training data samples may exist. Of these 943 training data samples, 29% are associated with the answer "1," 56% are associated with the answer "2," 12% are associated with the answer "3," and only 3% are associated with an answer greater than "3." For the counting question 203 "How many instruments in the video did not sound from beginning to end?" 1081 training data samples may exist. Of these 1081 training data samples, 66% are associated with the answer "0," 23% are associated with the answer "1," 6% are associated with the answer "2," and only 5% are associated with an answer greater than "2." For the counting question 204 "How many sounding <object> in the video?" 139 training data samples may exist. Of these 139 training data samples, 9% are associated with the answer "0," 53% are associated with the answer "1," 23% are associated with the answer "2," 7% are associated with the answer "3," and only 8% are associated with an answer greater than "3." As such, an AVQA machine learning model trained on this data may have a strong bias towards answering a smaller quantity when given an audio-visual counting question.

FIG. 3 shows an example training data imbalance 300 for an audio-visual temporal question. For the audio-visual temporal question "Which <object> makes the sound first or last?", four different answers are possible: "left," "middle," "right," and "simultaneously." 619 training samples associated with this question may exist. 448 of the 619 (e.g., 72.5%) of the training samples are associated with the answer "simultaneously." As such, an AVQA machine learning model trained on this data may have a strong bias towards answering "simultaneously" when given an audio-visual temporal question.

A balanced training dataset (e.g., MUSIC-AVQA v2.0) may be generated for training the machine learning model. The balanced training dataset enriches the imbalanced training dataset with additional (e.g., an additional 1204) real videos, leading to an additional inclusion of 7.9 k question-answer pairs. A substantial portion of the additional videos may be videos of musical instrument ensembles involving three or more instruments, capturing more complex audio-visual relationships.

In embodiments, generating the balanced training dataset may comprise pinpointing biased questions in the imbalanced training dataset. To pinpoint the biased questions, the distribution of answers for each question template under each question type may be determined or analyzed. It may be determined that a question is biased if a single answer represents over a threshold percentage (e.g., 60%) of responses for binary questions or exceeds a threshold percentage (e.g., 50%) for multi-class questions (e.g., questions with more than two possible answers). For example, it may be determined that one or more of audio-visual existential questions, audiovisual counting questions, audio-visual temporal questions, visual location questions, visual counting questions, audio counting questions, and audio comparative questions may exhibit a skewed answer distribution for at least one of their templates. Within these types, multiple templates may exhibit biases.

In the imbalanced training dataset, for audio-visual existential questions, binary questions dominate. For binary questions, the answers are either "yes" or "no." For example, for the question "Is this sound from the instrument in the video?" the answer for 90% of data samples in the imbalanced training dataset is "yes". To create question-answer pairs whose answers are "no," the audio track from the video may be replaced with audio of another instrument type. To make the question-answer pairs non-trivial, the set of instruments may be clustered into "string instrument," "woodwind instrument," "brass instrument," and "percussion instrument." There may be a 50% chance that the audio track is replaced with a different instrument of the same cluster, and a 50% chance that the audio track is replaced with instrument music belonging to other clusters. Using this method, 794 videos paired with non-matching audio segments may be created. For the question "Is there a voiceover?", the answers in the imbalanced training dataset may be severely imbalanced (e.g., 79.6% of answers are "no"). This imbalance may stem from the fact that some labelers define "voiceover" as a human voice appearing on top of the instrument sound, while others define it as any general "off-screen" sound. To fix such inconsistency, the term "voiceover" may be defined as any "off-screen sounds." After manually checking 1,278 video-audio-question pairs from the imbalanced training set, mislabeled entries may be corrected (e.g., 169 mislabeled entries). Despite this correction, a significant imbalance may remain with 68% of labels still being "no." To address this, additional question-answer pairs may be added. For example, another 456 question-answer pairs may be added where "voiceover" presents (answered "yes"), resulting in a balanced distribution with 51.7% yes" and 48.3% no" answers.

In the imbalanced training dataset, for audio-visual counting questions, the questions may be structured using four templates that address the following aspects of counting: (i) the total number of sounding instruments, (ii) the number of instrument types which are sounding, (iii) the number of a specific sounding instrument type, and (iv) the number of instruments that did not sound from the beginning to the end. The answers are restricted to "0-10" and "more than ten." In the imbalanced training dataset, "0", "1" and "2" dominate the answers. For all four templates, the most frequent answer exceeds 50% of the total, with one template even reaching 60%. To balance the audio-visual counting questions, musical ensemble performance videos where at least one answer to the aforementioned question templates exceeds two may be collected (e.g., manually or by a computing device). For example, music ensemble performance videos that are tagged with terms like "musical ensemble," "string quartet," or specific instrument names may be collected. For each instrument type, videos tagged with that type may be collected and combined with videos tagged as "musical ensemble," "string quartet," "quartet ensemble," or a specific instrument name, which helps narrow down potential candidates. From this set, videos that were of very low quality, had static scenes like album covers, or had ambiguous content may be filtered out (e.g., manually or by a computing device). For each selected video, the following may be annotated: (i) total number of instruments, (ii) number of distinct instrument types, (iii) count of each instrument type, (iv) number of sounding instruments, (v) number of distinct sounding instrument types, (vi) count of the most frequently appearing instrument that also produces sound, and (vii) number of instruments that made a sound from the beginning to the end of the video. In embodiments, 591 total videos for audiovisual counting questions may be collected. Using the annotations from these videos, additional question-answer pairs may be generated for each template: 572 (+39%) for T1, 502 (+25.4%) for T2, 815 (+40.1%, 350 from originally unlabeled videos for the question template in the imbalanced dataset, 465 from the collected videos) for T3, and 413 (+30.3%) for T4. These new pairs have answers from the less frequent answer categories. After adding these pairs, the imbalance issue from all four question templates is sufficiently mitigated, with the most frequent answer percentages decreasing by 16%, 17%, 15%, 13% for the 4 templates, respectively.

In the imbalanced training dataset, for audio-visual temporal questions, the candidate answers range from 22 instrument categories, as well as positional indicators like "left", "middle", "right" that specify an instrument's location. Additionally, the term "simultaneously" denotes that instruments play at the same time. Among three question templates in this question category, the question "Which <Object> makes the sound first/last?" shows a strong imbalance: 74% of answers are "simultaneously". To address this imbalance in a multi-class setting, question-answer pairs with the answers "left," "right," or "middle" may be labeled to diminish the dominance of the "simultaneously" category. For example, for a video where three violinists are performing, if the violinist on the left initiates the performance, followed by the middle and right violinists, a question-answer pair may be formulated as: "Q: Which violin starts playing first? A: left." In addition, the video may be augmented by horizontally flipping it. This transforms the question-answer pair to: "Q: Which violin starts playing first? A: right." Following the above procedure, additional targeted videos (e.g., an additional 203 videos) may be collected for creating question-answer pairs. After augmentation, 713 (+81.1%) additional question-answer pairs with answers other than "simultaneously" may be present in the dataset, reducing the most frequent answer percentage by 33% from 74% to 41.

In the imbalanced training dataset, unlike audio-visual questions, visual counting questions rely solely on visual information. The first two templates, "Is there <Object> in the entire video" and "Are there <Object> and <Object> instruments in the video" determine the presence of specific instruments. For these templates, the majority of answers are "yes," constituting 78.4% and 62.7% respectively. To counter this bias, additional (e.g., 794 and 423, respectively) question-answer pairs with the answer "no" may be generated for each template. These pairs may be created using labels from the collected videos. The third template focuses on counting the types of instruments present in the video. The third template is associated with a noticeable imbalance, with the answers "1" and "2" making up 91% of all responses. To address this, labels from the 591 videos from the audio-visual counting collection may be used. Videos where the answer to this question exceeded 2 may be selected. This selection may help to reduce the dominance of the top two answer categories, bringing their combined percentage down from 91% to 80%.

In the imbalanced training dataset, for visual location questions, this category of questions pertains to the location of the performance and the specific positioning of a performer. It seeks answers to whether the performance is indoor or outdoor and inquiries about the relative position of instruments in the video. Out of the four question templates in this category, the template "Where is the performance?" with answers either "indoor" or "outdoor," exhibits an outstanding imbalance. To address this, additional (e.g., 456) question-answer pairs whose answer is "outdoor" may be collected, resulting in a reduction of question-answer pairs with the dominant category ("indoor") by 17.9% from 72.6% to 54.7%.

In the imbalanced training dataset, for audio counting questions, the first two question templates, "Is there a <Object> sound?" and "Are there <Object1> and <Object2> sounds?" focus on the audio aspect, determining the presence of specific sounds. For these templates, the majority of answers are "yes", accounting for 76.0% and 78.8% respectively. To address this imbalance, additional (e.g. 794 and 423, respectively) question-answer pairs with the answer "no" may be created for each template, using labels from videos where the sounding instruments were identified. This reduces the dominance of the "yes" answer to 52.5% and 61.5% for the two templates, respectively. The third template queries the total number of distinct instrument sounds heard throughout the video. Notably, the answers "1" and "2" represent over 89% of all responses, highlighting a significant imbalance. To address the issue, question-answer pairs from the collection of ensemble performance videos may be labeled, specifically choosing videos where the answer to this question was neither "1" nor "2". After the balancing, the combined dominance of the "1" and "2" answers were reduced by 28% to 61%.

In the imbalanced training dataset, for audio comparative questions, this type of question compares different instruments sounding in the video in terms of loudness, duration and rhythm aspect. Among 3 question templates, a question template asking which instrument playing longer has a strong imbalance, where the answer "no" (indicating that neither instrument plays significantly longer) represents 68% of the data. To address this imbalance, question-answer pairs from previously unlabeled videos in the original imbalanced dataset may be curated, ensuring that the first <Object> plays longer than the second <Object>. This reduces the dominance of "no" answer to 53.9%.

Figure 4:
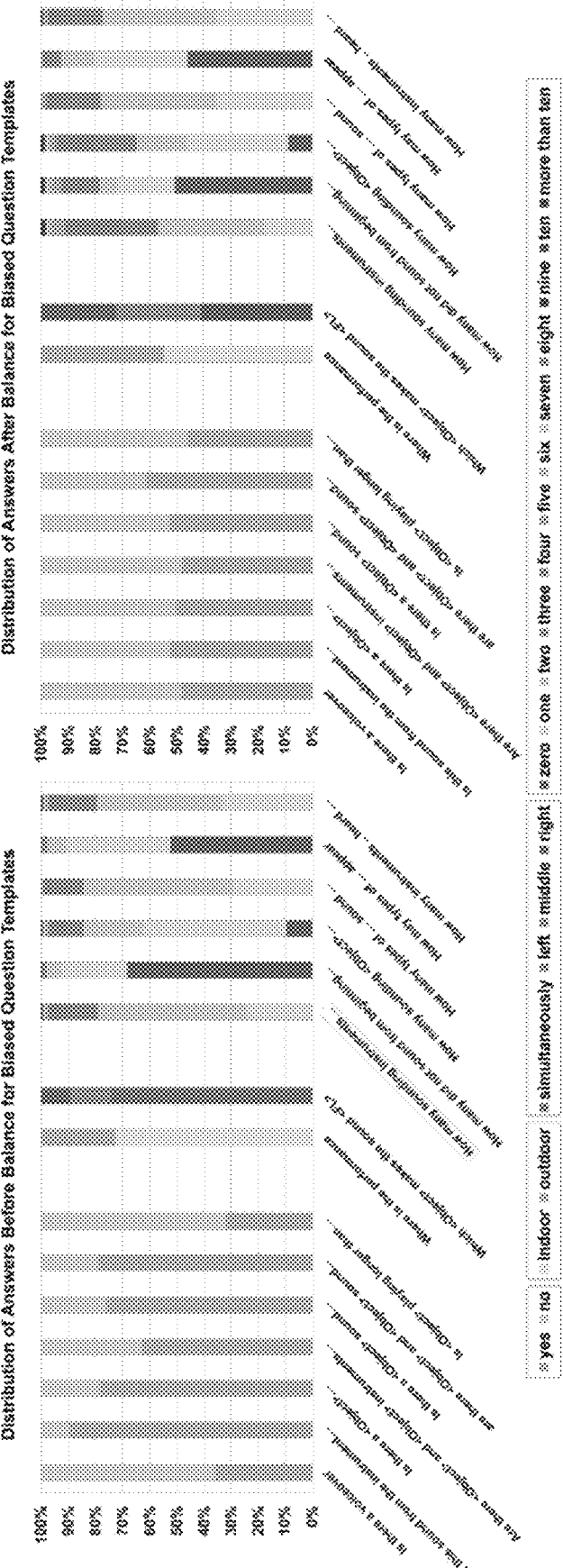
FIG. 4 shows an example distribution of training data before and after balancing in accordance with the present disclosure.

FIG. 4 shows a comparison 400 between the balanced dataset and the imbalanced dataset. The balanced dataset comprises balanced answer distribution in all three major question categories: audio-visual questions, visual questions, and audio questions. Across all three of these question categories, the balanced dataset comprises balanced answer distribution in five question aspects, including existential question aspects, temporal question aspects, counting question aspects, location question aspects, and comparative question aspects. When trained on the balanced dataset, the machine learning model performs better than AVQA machine learning models trained on the imbalanced dataset.

Figure 5:
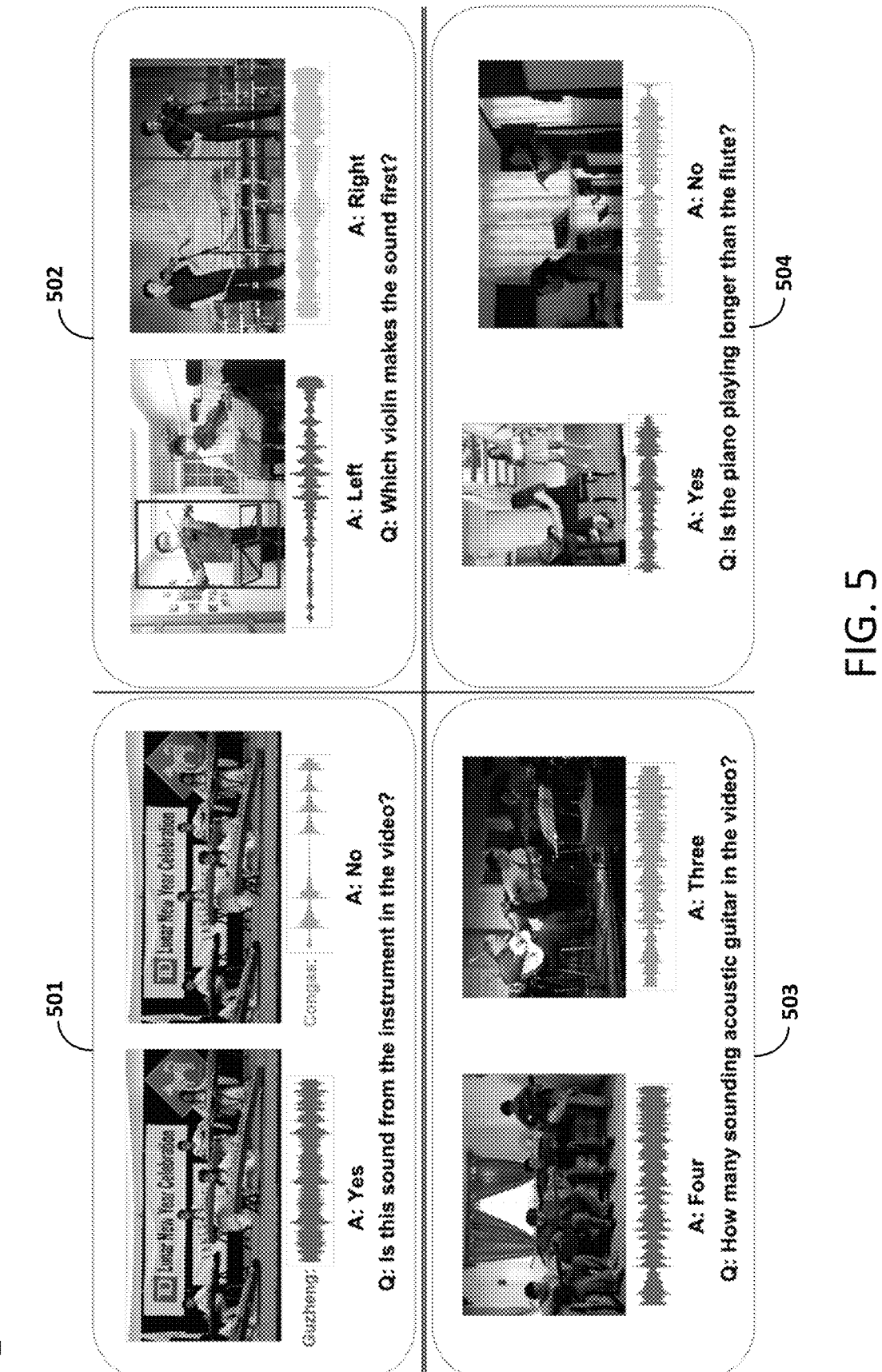
FIG. 5 shows example training data samples in accordance with the present disclosure.

FIG. 5 shows an overview 500 of training data samples from the balanced training data set. The training samples 501 showcase two videos. Each of the two videos has the same visuals. But each of the two videos has different audio. The training samples 502 showcase two videos. Each of the two videos displays two violinists. But each of the two videos displays the two violinists in different orders. The training samples 503 showcase two videos. Each of the two videos present acoustic guitar ensembles. But each of the two videos present acoustic guitar ensembles of different counts. The training samples 504 showcase two videos of a piano-flute duet. The piano plays longer in the first video. To answer accurately, AVQA machine learning models must consider these audio-visual nuances rather than just language priors. Accordingly, AVQA machine learning models trained on the balanced dataset performs better than AVQA machine learning models trained on the imbalanced dataset.

FIG. 6 illustrates an example process 600 performed by a system (e.g., system 100). The system 100 may perform the process 600 for improving audio-visual answering. Although depicted as a sequence of operations in FIG. 6, those of ordinary skill in the art will appreciate that various embodiments may add, remove, reorder, or modify the depicted operations.

At 602, a machine learning model may be configured. The machine learning model may be configured for audio-visual question answering (AVQA). The machine learning model may comprise a first sub-model. The first sub-model may comprise an audio spectrogram transformer (AST). The AST may be configured to capture semantic audio information. The AST may be configured to output an audio spatial feature map $x_{as}^{(1)}$. The machine learning model may comprise a second sub-model. The second sub-model may be configured to extract visual features $x_{vs}$ and audio features $x_{as}$. The second sub-model may be further configured to obtain a question vector $x_q$. The machine learning model may comprise a third sub-model. The third sub-model may comprise a cross-modal pixel-wise attention sub-model. The cross-modal pixel-wise attention sub-model may be configured to capture audio-visual correspondence. The cross-modal pixel-wise attention sub-model may be configured to capture audio-visual correspondence at a granular level.

At 604, a balanced AVQA dataset may be created. The balanced AVQA dataset comprises balanced answer distribution in each question category. For example, the balanced AVQA dataset may comprise a balanced answer distribution in three major question categories: audio-visual questions, visual questions, and audio questions. Across all three of these question categories, the balanced AVQA dataset may comprises balanced answer distribution in five question aspects, including existential question aspects, temporal question aspects, counting question aspects, location question aspects, and comparative question aspects.

At 606, the machine learning model may be trained. The machine learning model may be trained using at least a subset of the balanced AVAQ dataset. The machine learning model may be trained to answer questions about visual objects, sounds, and their associations in videos. At least in part because the machine learning model is trained on the balanced dataset, the machine learning model described herein performs better than AVQA machine learning models trained on imbalanced datasets.

FIG. 7 illustrates an example process 700 performed by a first sub-model (e.g., first sub-model 102). The first sub-model 102 may perform the process 700 for improving audio-visual answering. Although depicted as a sequence of operations in FIG. 7, those of ordinary skill in the art will appreciate that various embodiments may add, remove, reorder, or modify the depicted operations.

At 702, semantic audio information may be captured. The semantic audio information may be captured by a first sub-model. The first sub-model may receive, as input, an audio stream (e.g., spectrogram) associated with the musical performance video. The first sub-model may be configured to extract audio features from the audio stream using a pretrained AST. An audio spatial feature map $x_{as}^{(1)}$ may be generated. The audio spatial feature map $x_{as}^{(1)}$ may be generated by the first sub-model. The audio spatial feature map $x_{as}^{(1)}$ may be generated based on the captured semantic audio information.

The first sub-model 102 may comprise an audio-visual fusion branch. The first sub-model 102 may comprise an audio spectrogram transformer (AST). The first sub-model 102 may receive, as input, an audio stream (e.g., spectrogram) associated with the musical performance video. The first sub-model 102 may be configured to extract audio features from the audio stream using a pretrained AST. The first sub-model 102 may merge the extracted features with a visual feature branch of the second sub-model 104, leveraging audio-visual spatial and temporal grounding. The first sub-model 102 may enable the system 100 to capture richer semantic audio information compared to existing systems. Specifically, the hidden output of the first sub-model 102 may be extracted. The hidden output of the first sub-model 102 may comprise a spatial feature map $x_{as}^{(1)}$. The first sub-model 102 may apply average pooling on the spatial feature map $x_{as}^{(1)}$ to produce an audio vector $x_a^{(1)}$. At 704, average pooling may be applied. Average pooling may be applied on the audio spatial feature map $x_{as}^{(1)}$ to produce an audio vector $x_a^{(1)}$.

At 706, spatial attention may be computed. The spatial attention may be computed in relation to visual features output from the second sub-model. The first sub-model may compute spatial attention on the audio vector $x_a^{(1)}$ in relation to visual features (e.g., visual map) $x_{vs}$ output from a vision branch of a second sub-model. At 708, a first audio-visual fusion $x_{av}^{(1)}$ vector may be generated. The first audio-visual fusion vector $x_{av}^{(1)}$ may capture visual features attended by audio. At 710, temporal grounding may be performed. The temporal grounding may be performed on the first audio-visual fusion vector $x_{av}^{(1)}$ attended by a question vector $x_q$ along a temporal axis. $x_{av}^{(1)}$ may be concatenated with audio features, which are then attended by the question vector $x_q$ produced by a Long Short-Term Memory (LSTM) encoder along the temporal axis. The output of temporal grounding module may be a first question-aware audio-visual fusion vector $x_{qav}^{(1)}$. At 712, a first question-aware audio-visual fusion vector $x_{qav}^{(1)}$ may be generated.

FIG. 8 illustrates an example process 800 performed by a third sub-model (e.g., third sub-model 106). The third sub-model 106 may perform the process 800 for improving audio-visual answering. Although depicted as a sequence of operations in FIG. 8, those of ordinary skill in the art will appreciate that various embodiments may add, remove, reorder, or modify the depicted operations.

The third sub-model may be cross-modal pixel-wise attention sub-model configured to capture and refine audio-visual correspondence at a granular level. At 802, pixel-wise audio-visual attentions between visual features $x_{vs}$ and audio features $x_{as}$ may be captured. The pixel-wise audio-visual attentions between the visual features $x_{vs}$ and the audio features $x_{as}$ may be captured by a third sub-model to capture the correspondence between visual and audio modalities. The visual features and the audio features may be extracted by a second sub-model. Specifically, given $x_{vs} \in R^{H \times W \times C}$ representing a frame-level visual map output from the second sub-model, and $x_{as} \in R^{H \times W \times C}$ representing a spectrogram frame-level feature output from the second sub-model, the third sub-model may compute two pixel-wise audio-visual attentions between two maps. The spatial dimension of both feature maps may first be flattened to be (HW)×C, resulting in $x'_{vs}$ and $x'_{as}$. Then a mutual cross-attention between these two flattened maps may be computed, where each map attends to the other.

The obtained $x_{vas}$ and $x_{avs}$ represent the pixel-wise fusion maps for the audio and vision branch, respectively. The third sub-model may normalize both maps. The third sub-model may average pool the spatial dimensions of the normalized maps to produce two vectors, $x_{av}$ and $x_{va}$. The third sub-model may concatenate the two vectors, $x_{av}$ and $x_{va}$ to generate a second audio-visual fusion vector $x_{av}^{(2)}$. At 804, the second audio-visual fusion vector $x_{av}^{(2)}$ may be generated. The second audio-visual fusion vector $x_{av}^{(2)}$ may be generated by the third sub-model. The second audio-visual fusion vector $x_{av}^{(2)}$ may have the same dimensions as $x_{av}^{(0)}$, $x_{av}^{(1)}$ (i.e., the outputs of the spatial grounding modules from the first sub-model and the second sub-model). At 806, temporal grounding may be performed on the second audio-visual fusion vector $x_{av}^{(2)}$ attended by a question vector $x_q$ along a temporal axis. At 808, a second question-aware audio-visual fusion vector $x_{av}^{(2)}$ may be generated.

FIG. 9 illustrates an example process 900 performed by a system (e.g., system 100). The system 100 may perform the process 900 for improving audio-visual answering. Although depicted as a sequence of operations in FIG. 9, those of ordinary skill in the art will appreciate that various embodiments may add, remove, reorder, or modify the depicted operations.

At 902, a machine learning model may be configured. The machine learning model may be configured for audio-visual question answering (AVQA). The machine learning model may comprise a first sub-model. The first sub-model may be an audio spectrogram transformer (AST). The AST may be configured to capture semantic audio information. The AST may be configured to output an audio spatial feature map $x_{as}^{(1)}$. The machine learning model may comprise a second sub-model. The second sub-model may be configured to extract visual features $x_{vs}$ and audio features $x_{as}$. The second sub-model may be further configured to obtain a question vector $x_q$. The machine learning model may comprise a third sub-model. The third sub-model may be a cross-modal pixel-wise attention sub-model. The cross-modal pixel-wise attention sub-model may be configured to capture audio-visual correspondence. The cross-modal pixel-wise attention sub-model may be configured to capture audio-visual correspondence at a granular level.

At 904, a balanced AVQA dataset may be created. The balanced AVQA dataset comprises balanced answer distribution in each question category. For example, the balanced AVQA dataset may comprise a balanced answer distribution in three major question categories: audio-visual questions, visual questions, and audio questions. Across all three of these question categories, the balanced AVQA dataset may comprises balanced answer distribution in five question aspects, including existential question aspects, temporal question aspects, counting question aspects, location question aspects, and comparative question aspects. At 906, the machine learning model may be trained. The machine learning model may be trained using at least a subset of the balanced AVAQ dataset. The machine learning model may be trained to answer questions about visual objects, sounds, and their associations in videos. At least in part because the machine learning model is trained on the balanced dataset, the machine learning model described herein performs better than AVQA machine learning models trained on imbalanced datasets.

At 908, a question-aware audio-visual fusion vector $x_{qav}^{(0)}$, a first question-aware audio-visual fusion vector $x_{qav}^{(1)}$, and a second question-aware audio-visual fusion vector $x_{qav}^{(2)}$ may be concatenated. The question-aware audio-visual fusion vector $x_{qav}^{(0)}$ may be generated based on outputs from the second sub-model. The question-aware audio-visual fusion vector $x_{qav}^{(0)}$, the first question-aware audio-visual fusion vector $x_{qav}^{(1)}$, and the second question-aware audio-visual fusion vector $x_{qav}^{(2)}$ may be concatenated to generate a final question-aware audio-visual fusion vector. For example, the concatenation of the question-aware audio-visual fusion vector $x_{qav}^{(0)}$, the first question-aware audio-visual fusion vector $x_{qav}^{(1)}$, and the second question-aware audio-visual fusion vector $x_{qav}^{(2)}$ may be passed to a MLP for classification. The classification may indicate an answer to the audio-visual question.

Figure 10:
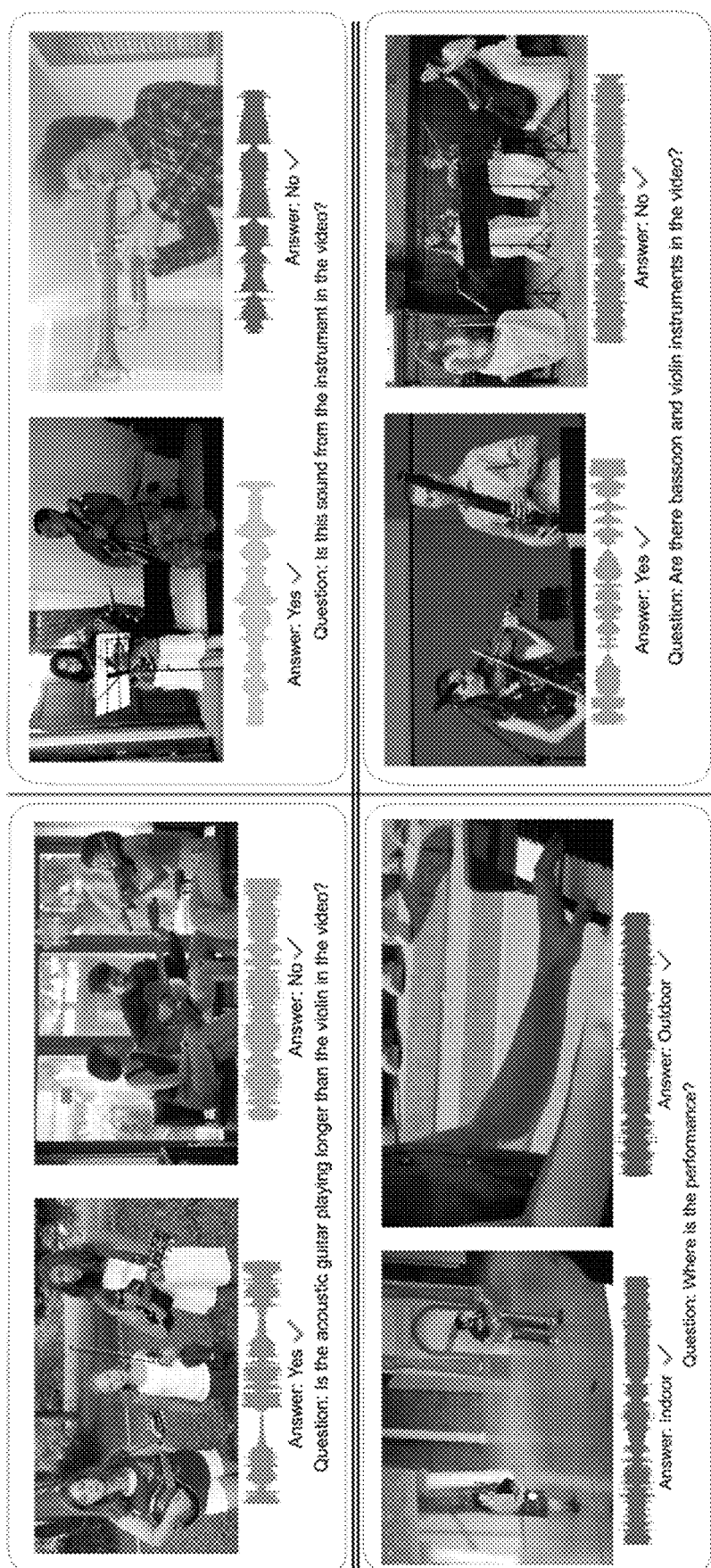
FIG. 10 shows example qualitative results in accordance with the present disclosure.

FIG. 10 shows example qualitative results 1000 in accordance with the present disclosure. The qualitative results 1000 show some of the contrasting question-answer samples predicted by the machine learning model of system 100. Overall, the machine learning model of system 100 can correctly predict contrasting question-answer pairs by better reasoning the audio-visual context than relying on language priors. The performance of existing AVQA machine learning model when trained on a balanced training dataset was compared with the performance of the same existing AVQA machine learning models when trained on an imbalanced training dataset. In particular, the performance of the existing models AVST and LAVISH when trained on both a biased and balanced datasets was evaluated. The balanced test set was determined by sampling 20% from MUSIC-AVQA v2.0, with balanced answer distribution in every question category using stratified sampling. Then within this balanced test set, a bias test set was sampled by keeping the same question-answer distribution as the biased dataset (e.g., with the corrected question-answer pairs in the "voiceover" category). Both the biased and balanced set test were used to evaluate the existing models AVST and LAVISH. After reserving the balanced test set from MUSIC-AVQA v2.0, the residual data remains balanced. To ensure a fair comparison, the training sets for both the biased and balanced datasets were of equal size. To achieve this, a bias subset was first extracted from the leftover balanced data. To maximize the training samples in this bias set, any question-answer pair with an answer belonging to the most frequent answer category within its question template is incorporated into the biased subset. Once the balanced test set is held out from MUSICAVQA v2.0, the remaining part is still a balanced dataset. To guarantee the fairness of comparison, the size of training set was kept the same for the bias and the balanced set. To achieve this, the bias subset was first sampled from the remaining balanced set. In order to maximize the number of training samples for the bias set, any question-answer pair whose answer is the most frequent answer category in its question template was included into the bias subset. For question-answer pairs in remaining answer categories in the question template, the numbers were determined by:

$$N_{most} \times \frac{N'_{other}}{N'_{most}},$$

where $N_{most}$ is the number of question-answer pairs whose answer is the most most frequent answer category of the question template in the remaining balanced set, $N_{most}'$ is the number of question-answer pairs whose answer is the most frequent answer category of the question template in the imbalanced training dataset, and $N_{other}'$ is the number of question-answer pairs whose answer is from another less frequent category of the question template in the imbalanced training dataset. Once the bias subset is created, another balanced subset may be sampled by keeping the same number of samples as the bias subset. In the last step, $\frac{1}{8}$ may be reserved for validation, with the remaining $\frac{7}{8}$ forming the biased and balanced training sets.

The outlined procedure therefore resulted in the creation of two datasets: a bias set and a balanced set. Each dataset contained 31,513 training samples, mirroring the size of the original imbalanced training set (approximately 31 k). Additionally, both datasets shared 4,502 validation samples, 10,819 balanced test samples, and 9,119 biased test samples. The performance of the two existing open-source models, the AVST model and the state-of-the-art LAVISH model, were then evaluated on the bias set and the balanced set, adhering strictly to their original training guidelines without any modifications. To validate the integrity of the code and data, both models were trained, validated, and tested using the original imbalanced dataset. The AVST model achieved a total accuracy of 71.25% on the test set (compared to the reported 71.51%), while the LAVISH model achieved 77.17% (close to the reported 77.20%). Then both models were trained on the biased and balanced training sets, resulting in 4 distinct models. For models trained on the biased set, the total accuracy on the bias validation set was used to select the best checkpoint across epochs. Similarly, for models trained on the balanced set, the total accuracy on the balanced validation set was used for checkpoint selection. After training, all four models were evaluated on both the bias and balanced test splits. The evaluation results are presented in FIG. 11 for the balanced test set and in FIG. 12 for the bias test set.

As shown in the table 1100 of FIG. 11, both models trained using the balanced set achieve higher total accuracy on the balanced test set, with gains of +1.75% for AVST and +2.96% for LAVISH. Specifically, in question types where a severe answer imbalance exists, such as audio-visual counting and existential questions, models trained on the balanced dataset consistently achieved higher accuracy. For instance, the LAVISH model showed improvements of +3.93% and +5.23% respectively. Conversely, as shown in the table 1300 of FIG. 12, the models trained on the bias set surpassed those trained on the balanced set when evaluated on the biased test set. These results suggest the data bias in original imbalanced training dataset. Models trained from the data overfit to the biases, thereby undermining their ability to generalize well.

The machine learning model described herein ("LAST-Att") was evaluated using the entire balanced dataset described herein. The entire balanced dataset described herein comprises 36.7 k question-answer pairs for training, 5,250 for validation, and 10,819 for testing. A variant of the machine learning model described herein was also evaluated. The variant (e.g., "LAST") integrates the existing LAVISH model with the first sub-model but does not include the third sub-model. As shown in the table 1300 of FIG. 13 and the table 1400 FIG. 14, both LASTAtt and LAST surpass the performance of existing models (LAVISH and AVST) on both test sets. Notably, on the balanced test set, LASTAtt achieves a performance boost of +2.26% over LAVISH and +4.42% over AVST.

To assess the models' true capability to understand audio-visual contexts and to ensure they do not merely rely on language priors, a contrasting binary question-answer evaluation was designed. A subset was curated from the balanced test split of MUSIC-AVQA v2.0, consisting of paired binary QA samples. Each pair contained two questions with identical phrasing but pertained to different videos that have opposite answers. For instance, the question "Are there ukulele and violin sounds in the video?" is posed for both video A and B. While the answer for video A is "yes", the answer is "no" for video B. From the balanced test set, 1643 such contrasting binary question-answer pairs were identified. For evaluation, a model must correctly answer both questions in a pair to be deemed accurate for that pair. This ensures that the model truly comprehends the audio and visual context of each video, given that the question phrasing is the same. As shown in the table 1500 of FIG. 15, in this challenging scenario, our LASTAtt model strongly outperforms the existing LAVISH and AVST models trained on the balanced set by margins of +4.39% and +6.46%, respectively. Overall, the model described herein model can correctly predict QA pairs by better reasoning the audio-visual context than relying on language priors.

In conclusion, the data bias that exists in the public MUSIC-AVQA dataset hinders the progress of multimodal research. The techniques described herein systematically address the data imbalance issue and propose an improved model and new and larger balanced dataset, MUSIC-AVQA v2.0. The new AST branch and an additional cross-modal pixel-wise attention sub-model described herein allows the improved model to consistently outperform previous methods on almost every question categories, serving as a strong baseline for AVQA tasks.

Figure 16:
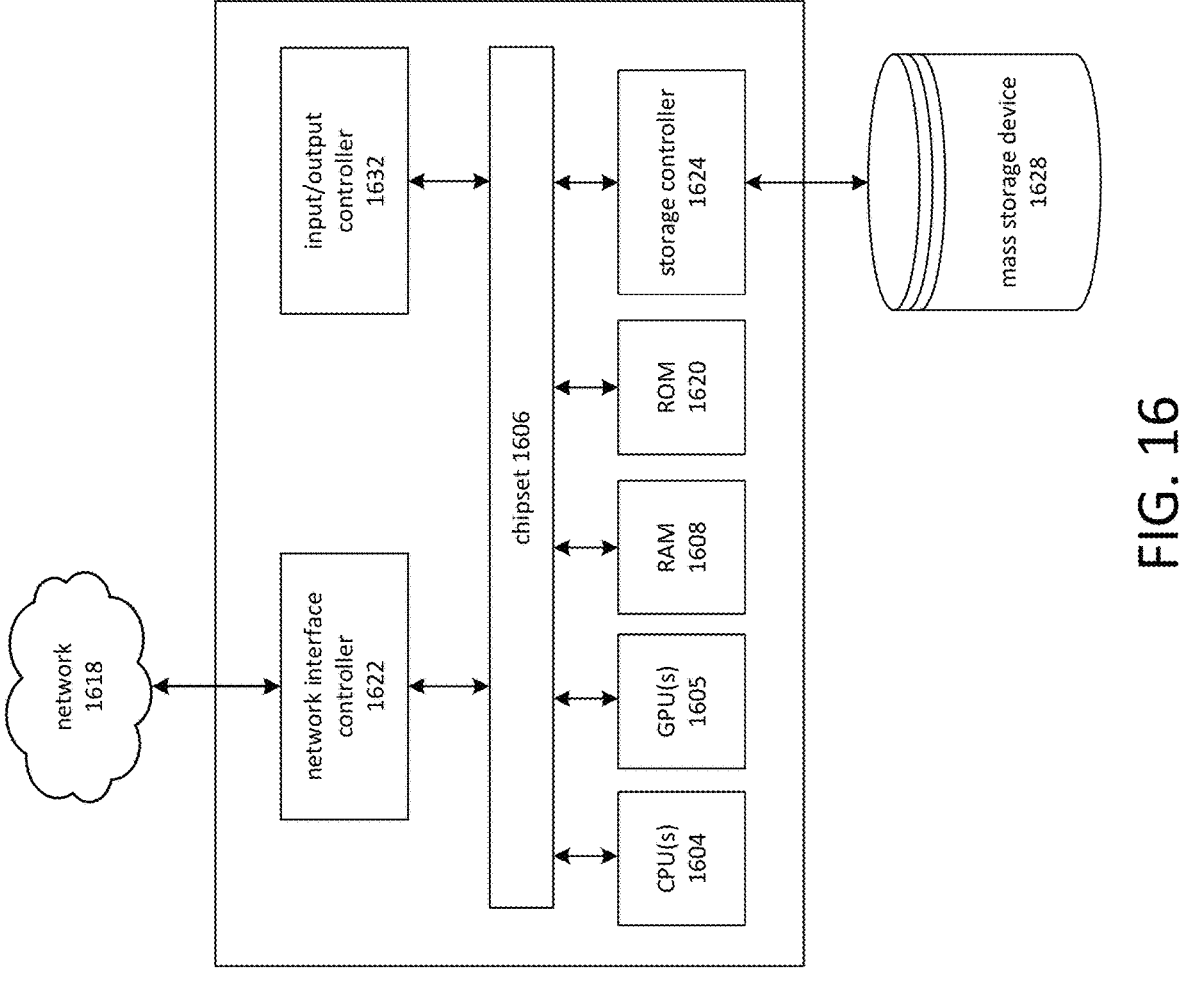
FIG. 16 shows an example computing device which may be used to perform any of the techniques disclosed herein.

FIG. 16 illustrates a computing device that may be used in various aspects, such as the services, networks, modules, and/or devices depicted in FIG. 1. With regard to the example architecture of FIG. 1, any or all of the components may each be implemented by one or more instance of a computing device 1600 of FIG. 16. The computer architecture shown in FIG. 16 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1600 may include a baseboard, or "motherboard," which is a printed circuit board to which a multitude of components or devices may be connected by way of a system bus or other electrical communication paths. One or more central processing units (CPUs) 1604 may operate in conjunction with a chipset 1606. The CPU(s) 1604 may be standard programmable processors that perform arithmetic and logical operations necessary for the operation of the computing device 1600.

The CPU(s) 1604 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1604 may be augmented with or replaced by other processing units, such as GPU(s). The GPU(s) may comprise processing units specialized for but not necessarily limited to highly parallel computations, such as graphics and other visualization-related processing.

A chipset 1606 may provide an interface between the CPU(s) 1604 and the remainder of the components and devices on the baseboard. The chipset 1606 may provide an interface to a random-access memory (RAM) 1608 used as the main memory in the computing device 1600. The chipset 1606 may further provide an interface to a computer-readable storage medium, such as a read-only memory (ROM) 1620 or non-volatile RAM (NVRAM) (not shown), for storing basic routines that may help to start up the computing device 1600 and to transfer information between the various components and devices. ROM 1620 or NVRAM may also store other software components necessary for the operation of the computing device 1600 in accordance with the aspects described herein.

The computing device 1600 may operate in a networked environment using logical connections to remote computing nodes and computer systems through local area network (LAN). The chipset 1606 may include functionality for providing network connectivity through a network interface controller (NIC) 1622, such as a gigabit Ethernet adapter. A NIC 1622 may be capable of connecting the computing device 1600 to other computing nodes over a network 1616. It should be appreciated that multiple NICs 1622 may be present in the computing device 1600, connecting the computing device to other types of networks and remote computer systems.

The computing device 1600 may be connected to a mass storage device 1628 that provides non-volatile storage for the computer. The mass storage device 1628 may store system programs, application programs, other program modules, and data, which have been described in greater detail herein. The mass storage device 1628 may be connected to the computing device 1600 through a storage controller 1624 connected to the chipset 1606. The mass storage device 1628 may consist of one or more physical storage units. The mass storage device 1628 may comprise a management component 1610. A storage controller 1624 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1600 may store data on the mass storage device 1628 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1628 is characterized as primary or secondary storage and the like.

For example, the computing device 1600 may store information to the mass storage device 1628 by issuing instructions through a storage controller 1624 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1600 may further read information from the mass storage device 1628 by detecting the physical states or characteristics of one or more particular locations within the physical storage units.

In addition to the mass storage device 1628 described above, the computing device 1600 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1600.

By way of example and not limitation, computer-readable storage media may include volatile and non-volatile, transitory computer-readable storage media and non-transitory computer-readable storage media, and removable and nonremovable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1628 depicted in FIG. 16, may store an operating system utilized to control the operation of the computing device 1600. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1628 may store other system or application programs and data utilized by the computing device 1600.

The mass storage device 1628 or other computer-readable storage media may also be encoded with computer-executable instructions, which, when loaded into the computing device 1600, transforms the computing device from a general-purpose computing system into a special-purpose computer capable of implementing the aspects described herein. These computer-executable instructions transform the computing device 1600 by specifying how the CPU(s) 1604 transition between states, as described above. The computing device 1600 may have access to computer-readable storage media storing computer-executable instructions, which, when executed by the computing device 1600, may perform the methods described herein.

A computing device, such as the computing device 1600 depicted in FIG. 16, may also include an input/output controller 1632 for receiving and processing input from a number of input devices, such as a keyboard, a mouse, a touchpad, a touch screen, an electronic stylus, or other type of input device. Similarly, an input/output controller 1632 may provide output to a display, such as a computer monitor, a flat-panel display, a digital projector, a printer, a plotter, or other type of output device. It will be appreciated that the computing device 1600 may not include all of the components shown in FIG. 16, may include other components that are not explicitly shown in FIG. 16, or may utilize an architecture completely different than that shown in FIG. 16.

As described herein, a computing device may be a physical computing device, such as the computing device 1600 of FIG. 16. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of improving audio-visual question answering, comprising:

configuring a machine learning model for audio-visual question answering (AVQA), wherein the machine learning model comprises a first sub-model configured to capture semantic audio information and output an audio spatial feature map $x_{as}^{(1)}$, wherein the machine learning model comprises a second sub-model configured to extract visual features $x_{vs}$ and audio features $x_{as}$ and further configured to obtain a question vector $x_q$, and wherein the machine learning model comprises a third sub-model configured to capture audio-visual correspondence at a granular level;

creating a balanced AVQA dataset, wherein the balanced AVQA dataset comprises balanced answer distribution in each question category;

training the machine learning model using at least a subset of the balanced AVAQ dataset; and generating, by the trained machine learning model, answers to questions about visual objects, sounds, and their associations in videos.

2. The method of claim 1, further comprising:

applying average pooling on the audio spatial feature map $x_{as}^{(1)}$ to produce an audio vector $x_a^{(1)}$; and computing spatial attention in relation to the visual features $x_{vs}$ output from the second sub-model.

3. The method of claim 2, further comprising:

generating a first audio-visual fusion vector $x_{av}^{(1)}$ that captures visual features attended by audio.

4. The method of claim 3, further comprising:

performing temporal grounding on the first audio-visual fusion vector $x_{av}^{(1)}$ attended by the question vector $x_q$ along a temporal axis; and generating a first question-aware audio-visual fusion vector $x_{qav}^{(1)}$.

5. The method of claim 1, further comprising:

computing pixel-wise audio-visual attentions between the visual features $x_{vs}$ and the audio features $x_{as}$ by the third sub-model to capture the correspondence between the visual and audio modalities.

6. The method of claim 5, further comprising:

generating a second audio-visual fusion vector $x_{av}^{(2)}$ by the third sub-model.

7. The method of claim 6, further comprising:

performing temporal grounding on the second audio-visual fusion vector $x_{av}^{(2)}$ attended by the question vector $x_q$ along a temporal axis; and generating a second question-aware audio-visual fusion vector $x_{qav}^{(2)}$.

8. The method of claim 1, further comprising:

concatenating a question-aware audio-visual fusion vector $x_{qav}^{(0)}$ generated based on outputs from the second sub-model, a first question-aware audio-visual fusion vector $x_{qav}^{(1)}$, and a second question-aware audio-visual fusion vector $x_{qav}^{(2)}$ to generate a final question-aware audio-visual fusion vector.

9. The method of claim 1, wherein there are a plurality of question categories, and the plurality of question categories comprise a category of audio-visual existential question, a category of audio-visual counting question, a category of audio-visual temporal question, a category of visual counting question, a category of visual location question, a category of audio counting question, and a category of audio comparative question.

10. A system of improving audio-visual question answering, comprising:

at least one processor; and at least one memory comprising computer-readable instructions that upon execution by the at least one processor cause the system to perform operations comprising:

configuring a machine learning model for audio-visual question answering (AVQA), wherein the machine learning model comprises a first sub-model configured to capture semantic audio information and output an audio spatial feature map $x_{as}^{(1)}$, wherein the machine learning model comprises a second sub-model configured to extract visual features $x_{vs}$ and audio features $x_{as}$ and further configured to obtain a question vector $x_q$, and wherein the machine learning model comprises a third sub-model configured to capture audio-visual correspondence at a granular level;

creating a balanced AVQA dataset, wherein the balanced AVQA dataset comprises balanced answer distribution in each question category;

training the machine learning model using at least a subset of the balanced AVAQ dataset; and generating, by the trained machine learning model, answers to questions about visual objects, sounds, and their associations in videos.

11. The system of claim 10, the operations further comprising:

applying average pooling on the audio spatial feature map $x_{as}^{(1)}$ to produce an audio vector $x_a^{(1)}$;

computing spatial attention in relation to the visual features $x_{vs}$ output from the second sub-model; and generating a first audio-visual fusion vector $x_{av}^{(1)}$ that captures visual features attended by audio.

12. The system of claim 11, the operations further comprising:

performing temporal grounding on the first audio-visual fusion vector $x_{av}^{(1)}$ attended by the question vector $x_q$ along a temporal axis; and generating a first question-aware audio-visual fusion vector $x_{qav}^{(1)}$.

13. The system of claim 10, the operations further comprising:

computing pixel-wise audio-visual attentions between the visual features $x_{vs}$ and the audio features $x_{as}$ by the third sub-model to capture the correspondence between the visual and audio modalities; and generating a second audio-visual fusion vector $x_{av}^{(2)}$ by the third sub-model.

14. The system of claim 13, the operations further comprising:

performing temporal grounding on the second audio-visual fusion vector $x_{av}^{(2)}$ attended by the question vector $x_q$ along a temporal axis; and generating a second question-aware audio-visual fusion vector $x_{qav}^{(2)}$.

15. The system of claim 10, the operations further comprising:

concatenating a question-aware audio-visual fusion vector $x_{qav}^{(0)}$ generated based on outputs from the second sub-model, a first question-aware audio-visual fusion vector $x_{qav}^{(1)}$, and a second question-aware audio-visual fusion vector $x_{qav}^{(2)}$ to generate a final question-aware audio-visual fusion vector.

16. A non-transitory computer-readable storage medium, storing computer-readable instructions that upon execution by a processor cause the processor to implement operations comprising:

configuring a machine learning model for audio-visual question answering (AVQA), wherein the machine learning model comprises a first sub-model configured to capture semantic audio information and output an audio spatial feature map $x_{as}^{(1)}$, wherein the machine learning model comprises a second sub-model configured to extract visual features $x_{vs}$ and audio features $x_{as}$ and further configured to obtain a question vector $x_q$, and wherein the machine learning model comprises a third sub-model configured to capture audio-visual correspondence at a granular level;

creating a balanced AVQA dataset, wherein the balanced AVQA dataset comprises balanced answer distribution in each question category;

training the machine learning model using at least a subset of the balanced AVAQ dataset; and generating, by the trained machine learning model, answers to questions about visual objects, sounds, and their associations in videos.

17. The non-transitory computer-readable storage medium of claim 16, the operations further comprising:

applying average pooling on the audio spatial feature map $x_{as}^{(1)}$ to produce an audio vector $x_a^{(1)}$;

computing spatial attention in relation to the visual features $x_{vs}$ output from the second sub-model; and generating a first audio-visual fusion vector $x_{av}^{(1)}$ that captures visual features attended by audio.

18. The non-transitory computer-readable storage medium of claim 17, the operations further comprising:

performing temporal grounding on the first audio-visual fusion vector $x_{av}^{(1)}$ attended by the question vector $x_q$ along a temporal axis; and generating a first question-aware audio-visual fusion vector $x_{qav}^{(1)}$.

19. The non-transitory computer-readable storage medium of claim 16, the operations further comprising:

computing pixel-wise audio-visual attentions between the visual features $x_{vs}$ and the audio features $x_{as}$ by the third sub-model to capture the correspondence between the visual and audio modalities; and generating a second audio-visual fusion vector $x_{av}^{(2)}$ by the third sub-model.

20. The non-transitory computer-readable storage medium of claim 19, the operations further comprising:

performing temporal grounding on the second audio-visual fusion vector $x_{av}^{(2)}$ attended by the question vector $x_q$ along a temporal axis; and generating a second question-aware audio-visual fusion vector $x_{qav}^{(2)}$.

\* \* \* \* \*